(12) United States Patent
Van De Sluis et al.

(10) Patent No.: US 8,466,932 B2
(45) Date of Patent: Jun. 18, 2013

(54) SYSTEM AND METHOD FOR AUTOMATICALLY SELECTING ELECTRONIC IMAGES DEPENDING ON AN INPUT

(75) Inventors: Bartel Marinus Van De Sluis, Eindhoven (NL); Dragan Sekulovski, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 538 days.

(21) Appl. No.: 12/747,526

(22) PCT Filed: Dec. 16, 2008

(86) PCT No.: PCT/IB2008/055334
§ 371 (c)(1),
(2), (4) Date: Jun. 11, 2010

(87) PCT Pub. No.: WO2009/081330
PCT Pub. Date: Jul. 2, 2009

(65) Prior Publication Data
US 2010/0265265 A1    Oct. 21, 2010

(30) Foreign Application Priority Data
Dec. 20, 2007 (EP) .................................... 07123855

(51) Int. Cl.
*G09G 5/02* (2006.01)

(52) U.S. Cl.
USPC ........... 345/595; 345/589; 345/593; 345/619; 345/581; 382/165; 382/168; 382/170; 382/305

(58) Field of Classification Search
None
See application file for complete search history.

(56) References Cited

U.S. PATENT DOCUMENTS

| 7,202,613 | B2 * | 4/2007 | Morgan et al. | 315/312 |
| 7,831,111 | B2 * | 11/2010 | Shah et al. | 382/305 |
| 2005/0275626 | A1 * | 12/2005 | Mueller et al. | 345/156 |
| 2007/0132748 | A1 | 6/2007 | Choi | |
| 2007/0133212 | A1 | 6/2007 | Lin et al. | |

OTHER PUBLICATIONS

Baigarova et al:"Modern Technology of Content-Based Retrieval in Digital Visual Archives"; Keldysh Institute of Applied Mathematics, Russian Acadamy of Sciences, Downloaded From http://www.artinfo.ru/eva/EVA2000M/eva-papers/200008/Baigarova-E.htm, on Oct. 8, 2007, 14 Page Document.

Lew et al: "Content-Based Multimedia Information Retrieval: State of the Art and Challenges"; ACM Transactions on Multimedia Computing, Communication and Applications, Vol. 2, No. 1, Feb. 2006, pp. 1-19.

* cited by examiner

*Primary Examiner* — Antonio A Caschera
(74) *Attorney, Agent, or Firm* — Mark L. Beloborodov

(57) ABSTRACT

A system and a method for automatic selection of images, which are displayed on a screen. Embodiments of the invention relate to a system for automatically selecting electronic images depending on an input, which includes input analyzing means being adapted for receiving an input, for analyzing the received input for dominant colors, and for outputting the analyzed dominant colors, image analyzing means being adapted for receiving electronic images, for analyzing each electronic image for colors dominant in tile image and for outputting tile analyzed dominant colors, and image selection means being adapted for receiving the outputted dominant colors from the input analyzing means and the image analyzing means, for processing the received dominant colors, for selecting an electronic image based on the processing, and for signaling the selection. This allows to automatically influence lighting in an environment such as a home, retail or hospitality environment.

7 Claims, 3 Drawing Sheets

SYSTEM AND METHOD FOR AUTOMATICALLY SELECTING ELECTRONIC IMAGES DEPENDING ON AN INPUT

The invention relates to the automatic selecting of electronic images, which are displayed on a screen, depending on an input.

Solid-State lighting will enable new forms of lighting including color lighting and dynamics, which make it possible to create a whole variety of atmospheres in a room or building. The atmosphere in an environment such as a home, retail or hospitality environment may be influenced by lighting, sounds, and images. Nowadays, images are usually captured with a video or photo camera, stored electronically on a data carrier, and displayed on flat panel displays such as computer or TV monitors or electronic picture frames.

US 2007/0133212 A1 discloses an illuminating device which may be connected to a television set, a computer monitor or an audio apparatus such that the illuminating device projects ambient light onto background walls or surroundings in order to improve the comfort and viewing experience. The device may comprise a transceiver accepting display information which may be extracted from a portion of at least one image or a portion of rhythm of at least one melody. The display information gathered by the transceiver may be used to control light sources to distribute lights in a time-varying manner or spread in space. With this device a lighting atmosphere may be influenced by the display information of for example a television set or computer monitor.

It is an object of the present invention to provide a novel system and method, which allow to automatically influencing an atmosphere in an environment.

The object is solved by the independent claims. Further embodiments are shown by the dependent claims.

A basic idea of the invention is to automatically select electronic images, which are displayed on a screen, depending on an input such as a lighting atmosphere or a color input. This allows to automatically influencing the atmosphere in an environment such as a home, retail or hospitality environment. A user must no longer take care of creating a desired atmosphere by manually selecting images, particularly executing the rather complex task of finding suitable images fitting a desired atmosphere, which often takes time and effort of an expert. Instead, the invention creates an automatic way to select images fitting to for example a desired lighting atmosphere by automatically selecting electronic images for example from a database containing electronic images, which may be provided for different atmospheres.

An embodiment of the invention provides a system for automatically selecting electronic images depending on an input, comprising input analyzing means being adapted for receiving an input, for analyzing the received input for dominant colors, and for outputting the analyzed dominant colors, image analyzing means being adapted for receiving electronic images, for analyzing each electronic image for colors dominant in the image and for outputting the analyzed dominant colors, image selection means being adapted for receiving the outputted dominant colors from the input analyzing means and the image analyzing means, for processing the received dominant colors, for selecting an electronic image based on the processing, and for signaling the selection.

An input herein means any possible input containing a color information. An input may for example be a signal with direct color information, such as a remote control signal for setting a color with a lighting system as it is sent out from the remote control of the LivingColors™ lamp of the applicant, or a more complex input such as a lighting atmosphere containing a range of colors. The term input as used herein must be understood in a broad sense, i.e. each possible input for an electronic system which may be analyzed for one or more colors contained in the input. This system may for example be embodied as a standalone electronic control device for screens, for example flat panel displays, electronic picture frames, computer monitors or any other screen provided for displaying an electronic picture for influencing an atmosphere. The control device may comprise interfaces for controlling screens, particularly for transmitting an electronic image, which is selected by the system for displaying, to a screen, and for receiving electronic images. The system may be also embodied as a module for an atmosphere creation system, for example a lighting system, in order to extend the functionality of the atmosphere creation system by an automatic image selection mechanism. One exemplary application of this system is the automatic control of the content of electronic displays of a user at her/his home, wherein the content is automatically selected depending on the current lighting atmosphere, which may be for example created by a home lighting system. In order to perform this task, the system may be for example coupled with a screen and/or TV set of the user for displaying a selected image.

The image analyzing means may be in a further embodiment of the invention adapted for receiving electronic images from one or more of the following: a local database, a network database, a data storage, a user input, a screen displaying electronic images, a computer, an electronic picture frame, a digital photo or video camera, a video recorder or player, a photo or video player. For example, the electronic images may be stored in a local database on a data carrier, such as a hard disk or an optical data carrier such as a DVD (Digital Versatile Disk). The images may be also stored in a network database, which may be provided on for example a database server in a computer network. The electronic images may be also stored as files on data storage, for example a hard disk, DVD, CD-ROM or memory card. The image analyzing means may receive electronic images also directly from image processing apparatuses such as a digital photo or video camera, a video recorder, a photo or video player, which may be for example directly connected with the system over dedicated interfaces such as serial or parallel computer interfaces or video signal interfaces.

The input analyzing means may be further adapted according to an embodiment of the invention for receiving an input from one or more of the following: a local database, a network database, a data storage, a lighting system being adapted for automatically creating a lighting atmosphere, light sensors, a color scanner, a color sensor, a color wheel, a color scanning and pointing device. A lighting atmosphere as input may be for example stored in a local, such as on a hard disk, or network database, such as in the internet accessible via a web service interface, or as one or more files stored on a memory card, optical data carrier, hard disk. Also, the system may be connected with a lighting system and obtain the lighting atmosphere from the lighting system over this connection. The color scanner, color sensor, color wheel, color scanning and pointing device enable different opportunities for a direct user input of a preferred color. For example, a user may simply hold the preferred color before the color scanner or sensor, may use a color wheel for comfortably selecting the preferred color or use a color scanning and pointing device, which may be used to copy (scan) a preferred color from a certain location and to reproduce (point) the color at another location, typically at an interface of the image selection means. This allows to more directly influencing the selecting of images. For example, a user may influence the automatic image selection process in that she or he inputs a color, which she or he prefers and which is then analyzed by the input analyzing means as the dominant color. Then, the color input of the user may be processed by the image selection means in such a way that the selection of images is based on the inputted color.

According to an embodiment of the invention, the input analyzing means may be further adapted to analyze the received input for dominant colors based on one color, a set of colors, which are represented in a predefined color space and used in the input, or on a color label or a set of color labels derived from one or more colors used in the input. For example, a lighting atmosphere as input may be analyzed for one predominant color. This color may be outputted as a dominant color, which may be used for the image selection. However, it is also possible to analyze the lighting atmosphere for a set of colors, particularly predominant colors, thus enabling an image selection based on more than one dominant color. Also, the lighting atmosphere may be analyzed based on a (set of) color label(s), which make the process of analyzing the atmosphere quicker since color labels usually do not require the analysis of the color composition of the lighting atmosphere.

Furthermore, the image analyzing means may be adapted in an embodiment of the invention to apply image analysis and classification techniques, which are adapted to check an electronic image for one or more of the following characteristics: representations being classified as undesired, a predetermined aspect ratio, picture quality, resolution, a predetermined aesthetic value. This allows to further refine the automatic image selection, for example in that certain images are not selected, because their representation is classified as undesired, their picture quality is not sufficient, their resolution is not sufficient, or they do not achieve an aesthetic value, which is predetermined by a user. The aesthetic value of an electronic image may be for example determined in meta data of the image.

In a further embodiment of the invention, the image analyzing means may be adapted for receiving the outputted dominant colors from the input analyzing means and for searching electronic images based on the received outputted dominant colors. Thus, a color based image search may be performed by the image analyzing means, particularly images with a desirable color composition may be searched by the image analyzing means, a method, which is extensively treated in the Content Based Image Retrieval (CBIR) community. An overview of the recent developments in the field and the broader multimedia information retrieval may be found in the publication "Content-based Multimedia Information Retrieval: State of the Art and Challenges", M. Lew, N. Sebe, C. Djeraba, R. Jain, in ACM Transactions on Multimedia Computing, Communications, and Applications, pp. 1-19, 2006.

A further embodiment of the invention provides an atmosphere creation system comprising
a lighting system comprising several light units and being adapted to automatically generate a lighting atmosphere with the light units, and
an image displaying system comprising several display units for displaying electronic images and a system for automatically selecting electronic images depending on an input created by the lighting system according to the invention and as described above.

Such an atmosphere creation system may be for example installed in a home, retail or hospitality environment in order to automatically create a desired atmosphere in the environment with images which fit a theme or mood currently created by the atmosphere creation system.

Furthermore, an embodiment of the invention provides a method for automatically selecting electronic images depending on an input, comprising the steps of:
receiving an input and analyzing the received input for dominant colors,
outputting the analyzed dominant colors,
receiving electronic images and analyzing each electronic image for colors dominant in the image,
outputting the analyzed dominant colors,
receiving the outputted dominant colors and processing the received dominant colors,
selecting an electronic image based on the processing and signaling the selection.

According to a further embodiment of the invention, a computer program may be provided, which is enabled to carry out the above method according to the invention when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access.

Finally, an embodiment of the invention provides a computer programmed to perform a method according to the invention and comprising an interface for communication with one or more electronic displays for displaying electronic images.

These and other aspects of the invention will be apparent from and elucidated with reference to the embodiments described hereinafter.

The invention will be described in more detail hereinafter with reference to exemplary embodiments. However, the invention is not limited to these exemplary embodiments.

In the following, functionally similar or identical elements may have the same reference numerals.

Future atmosphere creation systems will not be restricted to lighting and will also be able to control the content on electronic displays, which can be used to represent atmosphere images fitting the atmosphere created. This invention proposes a system, which is able to automatically find one or multiple atmosphere images in a database fitting a given input such as a lighting atmosphere. This is achieved by using one or more colors dominant in the given input, for example the lighting atmosphere, and finding atmospheric images in which these colors are also prominent.

Figure 2:
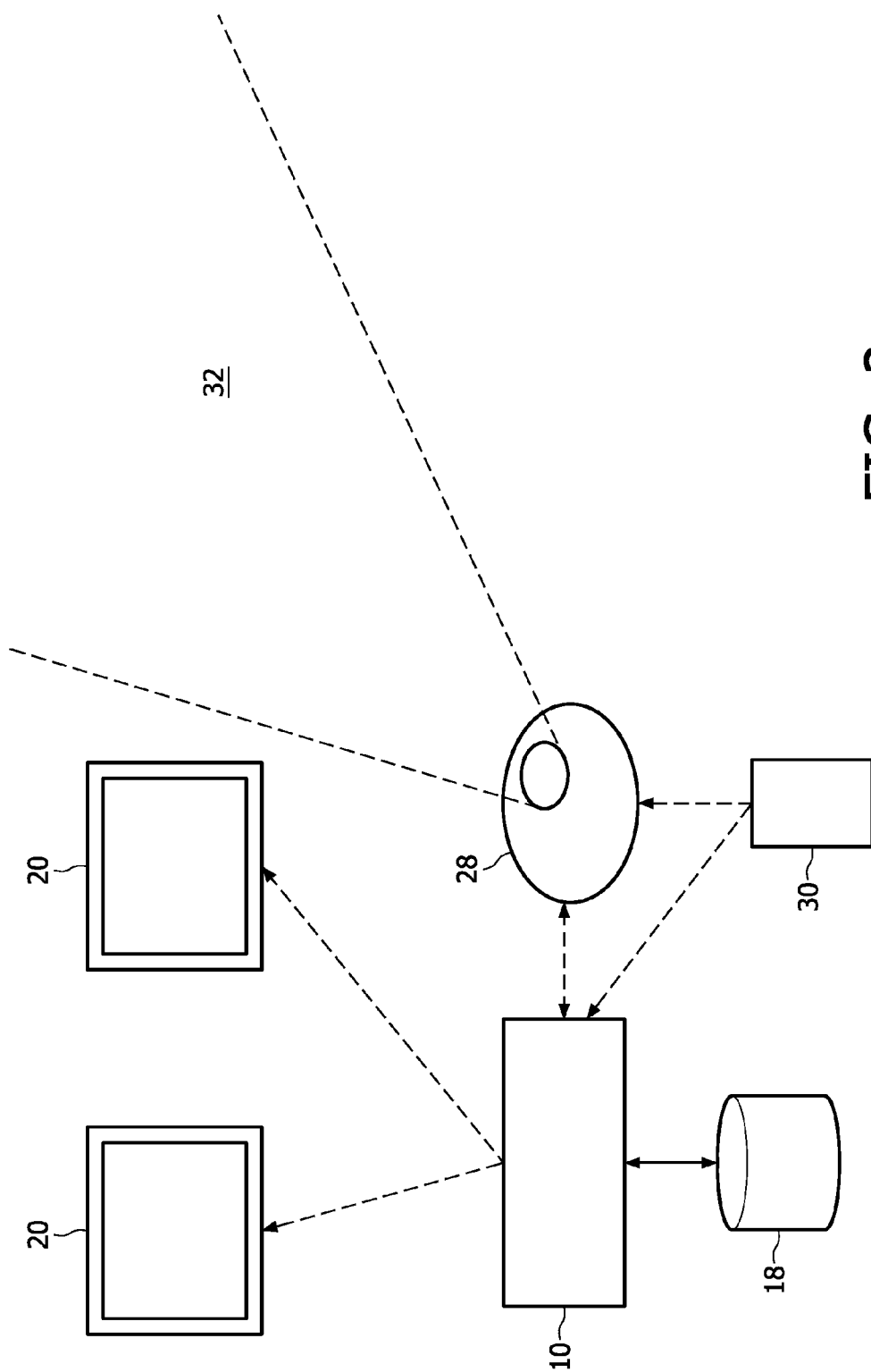
FIG. 2 shows an embodiment of the system for automatically selecting electronic images, which is coupled with a lighting atmosphere creation lamp.

In one embodiment of the invention, as shown in FIG. 2, a consumer may have a lighting system 28 such as a color light element at home, for example a LivingColors™ lamp, which contains several color LEDs (Light Emitting Diodes) as light units and may be controlled by a remote control unit 30 with a color wheel for selecting a desired lighting color. A user selection of a desired lighting color is transmitted from the remote control unit 30 to the lighting system 28, which then automatically creates a lighting atmosphere 32 with the desired lighting color by controlling the color LEDs appropriately. The lighting system 28 comprises an interface, which is adapted to communicate with an automatic image selection system 10. Furthermore, the automatic image selection system 10 may also directly receive and process the user selection of a desired lighting from the remote control unit 30. The system 10 has access to a local database 18, which comprises different electronic images, provided for different lighting atmospheres. The system 10 comprises a further interface for coupling the system 10 with screens 20, for example a TV or digital photo frame. The interfaces of the system 10 may be adapted to communicate with the lighting system 28 and the screens 20 by a wireless, a wired, or a combined wireless/wired communication link. For example, the system may comprise a WLAN (Wireless Local Area Network), a Bluetooth®, a ZigBee® or another radio communication interface and/or a LAN, USB (Universal Serial Bus), IEEE1394 communication interface. By selecting a color for the lighting system 28, the system 10 could automatically find and display atmospheric images on the screen(s) 20, in which this selected color is dominantly present. Also in professional environments such as retail or hospitality environments besides advanced lighting rendering elements, multiple electronic displays can be present which not only can present information or commercial content, but also be used to display images which fit theme or mood currently created by the atmosphere creation system, particularly to match the content on electronic displays to a particular color prominent in the lighting atmosphere.

Figure 1:
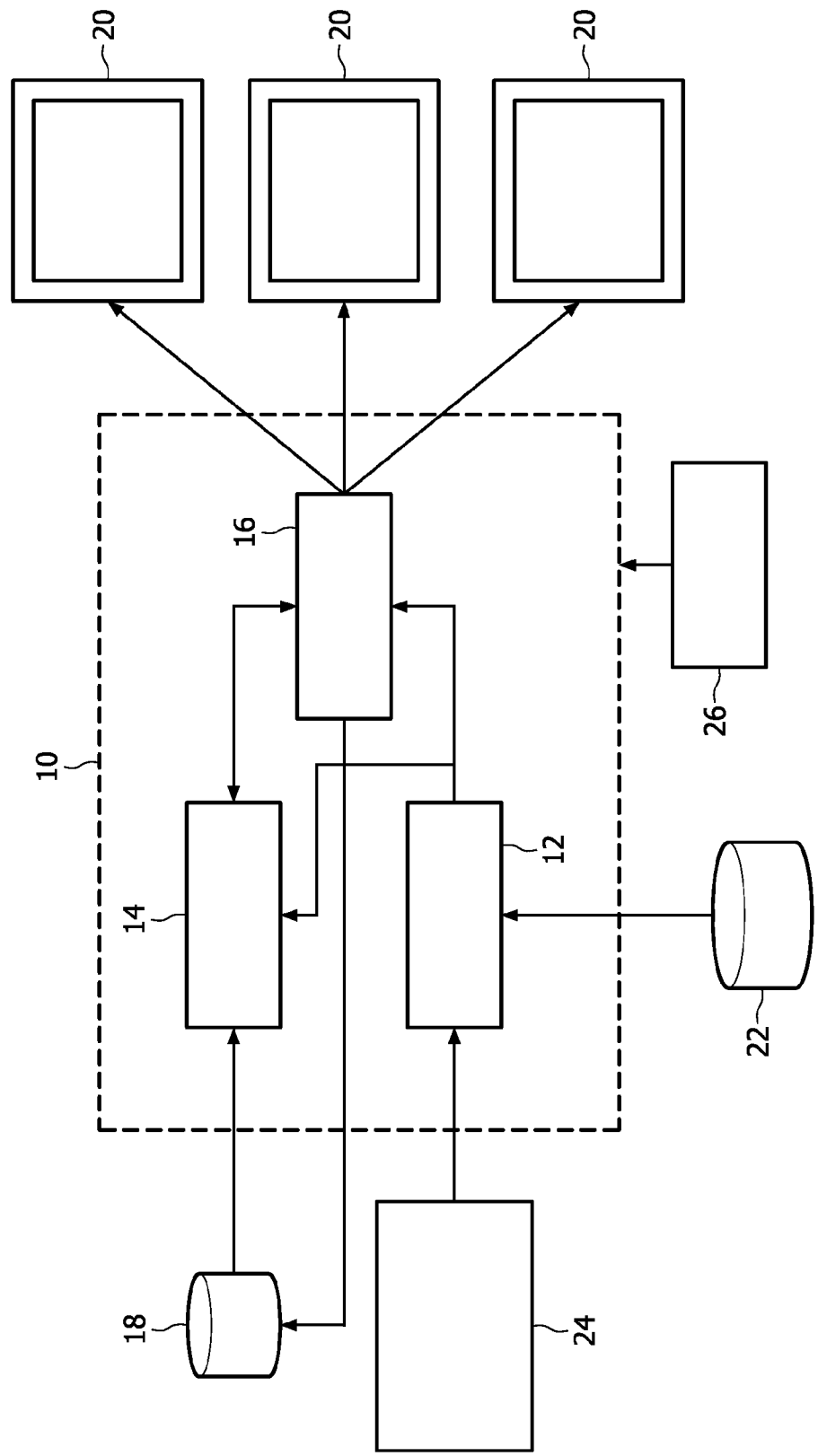
FIG. 1 shows a block diagram of an embodiment of a system for automatically selecting electronic images depending on a lighting atmosphere as input according to the invention.

FIG. 1 shows a further embodiment of a system 10 for automatically selecting electronic images depending on a lighting atmosphere as input created by a lighting system 24 in detail. The system 10 comprises input analyzing means 12, image analyzing means 14 and image selection means 16, which may be implemented for example by processing elements. The system 10 is coupled to the lighting system 24 for receiving the lighting atmosphere by the input analyzing means 12. The system 10 is also coupled to a data storage 22, which may contain a lighting atmosphere description. Finally, the system 10 is coupled to screens 20, which are provided for displaying electronic images.

The input analyzing means 12 are adapted either to receive and analyze a lighting atmosphere from the lighting system 24 or to read a lighting atmosphere description from the data storage 22. The input analyzing means 12 are adapted to analyze the received lighting atmosphere for dominant colors and output the analyzed dominant colors to the image selection means 16 and the image analyzing means 14.

The image analyzing means 14 are adapted to receiving electronic images from a local database 18, particularly for searching through the images. The received images are then analyzed for colors dominant in the image. The image analyzing means 14 output dominant colors to the image selection means 16.

The image selection means 16, which receive the outputted dominant colors from the input analyzing means 12 and the image analyzing means 14, are adapted to process the received dominant colors, for example to determine whether the dominant colors contained in an electronic image lies within the color space defined by the dominant colors contained in the analyzed lighting atmosphere. Based on the processing, an electronic image may be selected for displaying it on a screen 20, and the image selection means 16 signal the selection, particularly forward the selected electronic image to a screen 20 for displaying. If the processing results in that an electronic image is not selected, the image selection means 16 receive dominant colors from the image analyzing means, which result from the analysis of another electronic image, which was read by the image analyzing means 14 from the local database 18. In this way, the electronic images stored in the local database 18 may be searched through for an image, which is suited for the lighting atmosphere created by the lighting system 24, thus enabling the displaying of the suitable image on one or more screens 20.

The image search can be done based on one color or a set of colors (represented in a suitable color space, for example sRGB) used in the lighting atmosphere, or on a (set of) color label(s) derived from the colors. An example of a set of colors and their corresponding labels is given in the table below.

| Color (sRGB) | Label |
| --- | --- |
| (255, 0, 0) | Red |
| (100, 20, 200) | Royal blue, Blue |
| (250, 150, 0) | Orange |

The problem of finding images with a desirable color composition is extensively treated in the Content Based Image Retrieval (CBIR) community. For an overview of the recent developments in the field and the broader Multimedia Information retrieval an overview is given in the publication "Content-based Multimedia Information Retrieval: State of the Art and Challenges", M. Lew, N. Sebe, C. Djeraba, R. Jain, in ACM Transactions on Multimedia Computing, Communications, and Applications, pp. 1-19, 2006.

Translating the search colors to labels is a nontrivial task that recently got some attention from the same CBIR community. See for example "A computational model for color naming and describing color composition of images", A. Mojsilovic, in IEEE Transactions on Image Processing 14, pp. 690-699, May 2005, for a recent system using knowledge from human perception and naming of colors for improved image searching.

Both above mentioned groups of methods may be used for searching for images that are similar to an example image or a sketch of the desired result. Contrary to that, the present invention uses the definition of the lighting atmosphere as input to the search.

The database of images can be either a (local) given database of pictures such as Corel® Image database or a local image database of the user, or it can be images made available through a web service, such as the Google® Images search engine or the Flickr.com image database. In the case of a local database, both approaches can be used. Dependent on the type of database the quality of the labels per images may differ. The labels may be created automatically or may be manually annotated by users uploading the image like at Flickr.com.

Especially if a less controlled database of images is used, it may be desired to screen the images on appropriateness. For instance, images containing violence, naked bodies, disasters etc may be undesired. Furthermore, properties such as aspect ratio, picture quality, resolution may need to be checked. Ultimately one may desire to check what the aesthetic value is of an image, or whether it is an 'atmospheric' image. For this, image analysis and classification techniques can be applied.

Various color control user interaction solutions, such as a color scanner, a color sensor, a color wheel and color scanning and pointing device may be applied in the system as interface 26 for a color input by a user. Thus, a user may more directly influence the selection of electronic images.

The color scanning and pointing device enables a user to "paint with light" and to comfortably input a desired color, which the user has copied from a certain location comprising the desired color. The device allows a user to pick a color by either pointing to another luminary or by touching a colored surface in the environment and to "paint" this color by pointing to the target luminary. When pointing the color scanning and pointing device to an electronic display it could be used to automatically create an atmospheric image on the display in which the copied color is prominent. One can imagine that by pressing a "paste" button of the color scanning and pointing device multiple times the user can simply "toggle" through multiple suitable images enabling him to select the most desired one. The color scanning and pointing device may communicate with the system 10 by means of a wireless or wired communication link.

In a home environment, a user may use a color wheel as input device for a color input to control the color of a Living-Colors™ lamp, while at the same time the image on one or more displays (TV, digital photo frame, PC-screen) is updated to present images corresponding to the selected color. The possibility to use pictures from the user's database gives the user the opportunity to further personalize his or her atmosphere.

In a retail or hospitality environment, there may be an advanced lighting system including LED panels and color lighting for wall-washing effects. Based on the selected atmosphere preset, the system according to the invention can derive one or more colors prominent in the current lighting preset and use this information to find and display correspondingly colored images on the available screens.

An electronic image can be static (photos) or dynamic (videos). User involvement in the selection such as via a user input interface (reference numeral 26 in FIG. 1) may help to enhance the performance, for instance, a user can be given the option to choose from several found images. Multiple images can be needed. For instance multiple images can be displayed on one screen, there can be multiple screens available, or it may be desired to frequently update the image on the screens while the prominent lighting color remains unchanged. In these cases it may be desired to have a coherent theme across all pictures. This coherency may be created by the system or by the user. The system according to the invention may detect a common label on the images found for a particular color (e.g. flower, landscape, car), whereas the user may be given the possibility to add such a desired theme label, for instance via text entry or selection from a list.

It may also be desired to stretch one image over multiple adjacent displays. For this knowledge is needed about the relative positioning of these displays, the resulting aspect ratio and resolution needed.

Figure 3:
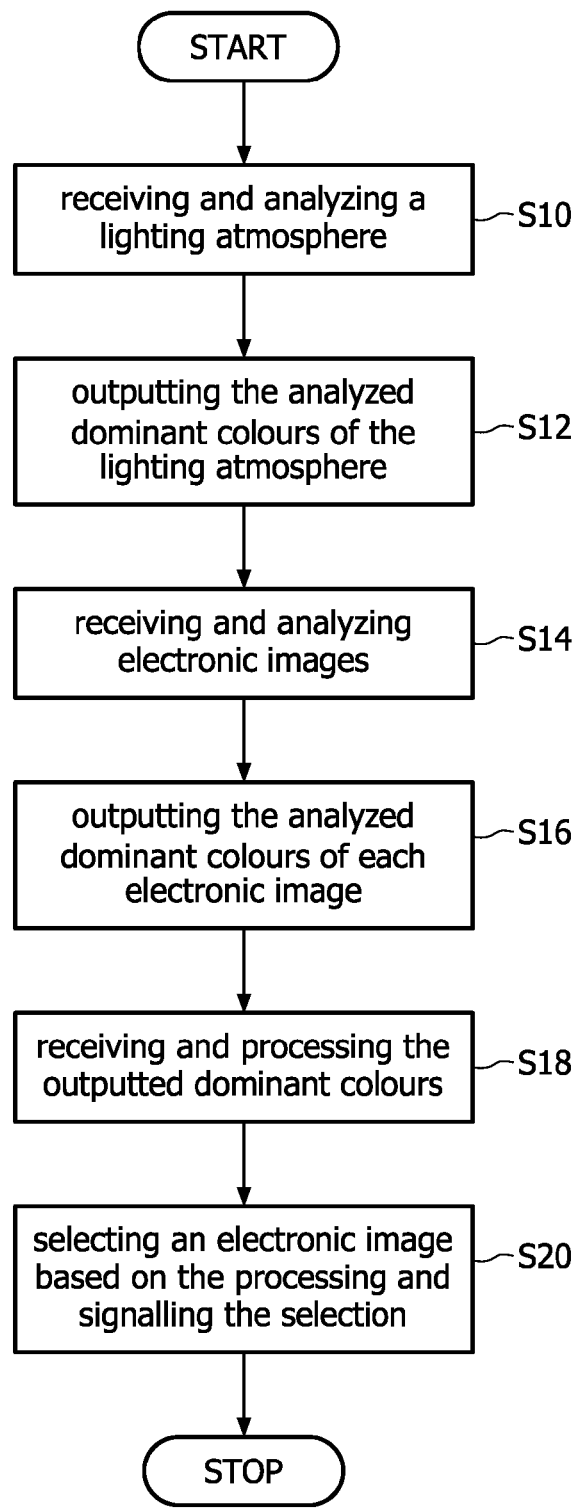
FIG. 3 shows a flow chart of an embodiment of a method for automatically selecting electronic images depending on a lighting atmosphere as input according to the invention.

FIG. 3 shows an embodiment of a flowchart of a method for automatically selecting electronic images depending on a lighting atmosphere as input. In step S10, a lighting atmosphere is received and the received lighting atmosphere is analyzed for dominant colors. As a result, the analyzed dominant colors are output in step S12. Then, in step S14, electronic images are received and each electronic image is analyzed for colors dominant in the image. As result, he analyzed dominant colors are output in step S16. In step S18, the outputted dominant colors are received and the received dominant colors are processed. Finally, an electronic image is selected based on the processing and the selection is signaled in step S20. This method can be implemented as computer program, which can be executed for example by means of a PC (Personal Computer). Thus, images displayed on the PC monitor may be automatically selected with the computer program. The before explained method can be executed also in a continuous loop (instead of a single start/stop sequence), especially when having a dynamic lighting atmosphere. This would be useful to have automatically updating images displayed on one or multiple electronic displays.

The herein described invention can be applied to a lighting system or atmosphere creation systems, which are not be restricted to lighting, in order to enable such systems to also control the content on electronic displays, which can be used to represent atmosphere images fitting an atmosphere created. A further application of the invention is a home environment, wherein a consumer may have a color light element at home which may be coupled according to embodiments of the invention to a screen, TV or electronic photo frame, to create a nice atmosphere. The invention may also be applied in a retail or hospitality environment besides advanced lighting rendering elements, wherein multiple electronic displays can be present which not only can present information or commercial content, but can according to embodiments of the invention also be used to display images which fit a theme or mood currently created by the atmosphere creation system.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A system for automatically selecting electronic images depending on an input, comprising
input analyzing means for receiving an input, for analyzing the received input for dominant colors, and for outputting tile analyzed dominant colors,
image analyzing means for receiving electronic images, for analyzing each electronic image for colors dominant in the image and for outputting the analyzed dominant colors,
image selection means for receiving the outputted dominant colors from the input analyzing means and the image analyzing means, for processing the received dominant colors, for selecting an electronic image based on tile processing, and for signaling the selection.

2. The system of claim 1, wherein the image analyzing means receive electronic images from one or more of the following: a local database, a network database, a data storage, a user input, a screen displaying electronic images, a computer, an electronic picture frame, a digital photo or video camera, a video recorder or player, a photo or video player.

3. The system of claim 1, wherein the input analyzing means receive an input from one or more of the following: a local database, a network database, a data storage, a lighting system being adapted for automatically creating a lighting atmosphere, light sensors, a color scanner, a color sensor, a color wheel, a color scanning and pointing device.

4. The system of claim 1, wherein the input analyzing means analyzes the received input for dominant colors based on one color, a set of colors, which are represented in a predefined color space and used in the input, or on a color label or a set of color labels derived from one or more colors used in the input.

5. The system of claim 1, wherein the image analyzing means applies image analysis and classification techniques, which are adapted to check an electronic image for one or more of the following characteristics: representations being classified as undesired, a predetermined aspect ratio, picture quality, resolution, a predetermined aesthetic value.

6. The system of claim 1, wherein the image analyzing means receive the outputted dominant colors from the input analyzing means and search electronic images based on the received outputted dominant colors.

7. An atmosphere creation system comprising
- a lighting system comprising several light units and being adapted to automatically generate a lighting atmosphere with the light units, and
- an image displaying system comprising several display units for displaying electronic images and a system for automatically selecting electronic images depending on an input according to claim 1.

* * * * *

UNITED STATES PATENT AND TRADEMARK OFFICE
CERTIFICATE OF CORRECTION

PATENT NO. : 8,466,932 B2
APPLICATION NO. : 12/747526
DATED : June 18, 2013
INVENTOR(S) : Bartel Marinus Van De Sluis and Dragan Sekulovski Page 1 of 1

It is certified that error appears in the above-identified patent and that said Letters Patent is hereby corrected as shown below:

Title Page;

In the ABSTRACT the word "tile" should be replaced with the word --the-- in lines 9 and 10

In the Claims;

In Column 8, lines 40 and 49, Claim 1, the word "tile" should be replaced with the word --the--

Signed and Sealed this
First Day of March, 2016

Michelle K. Lee
*Director of the United States Patent and Trademark Office*